Sept. 6, 1932. M. HARDING 1,876,224
CANDY SUGARING MECHANISM
Filed July 22, 1930   3 Sheets-Sheet 2
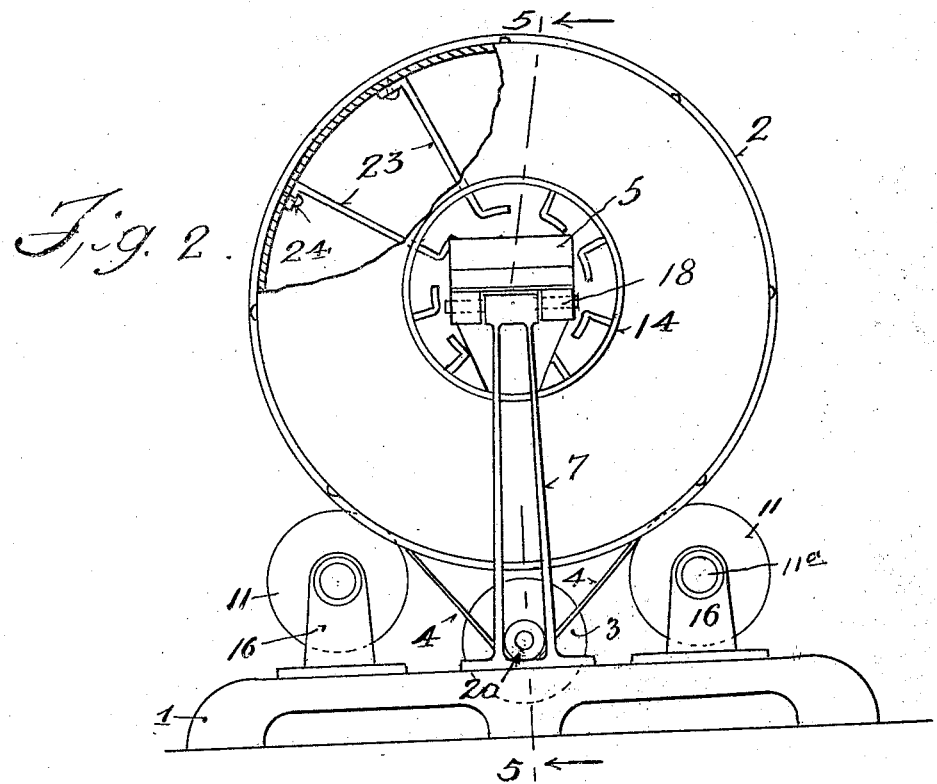
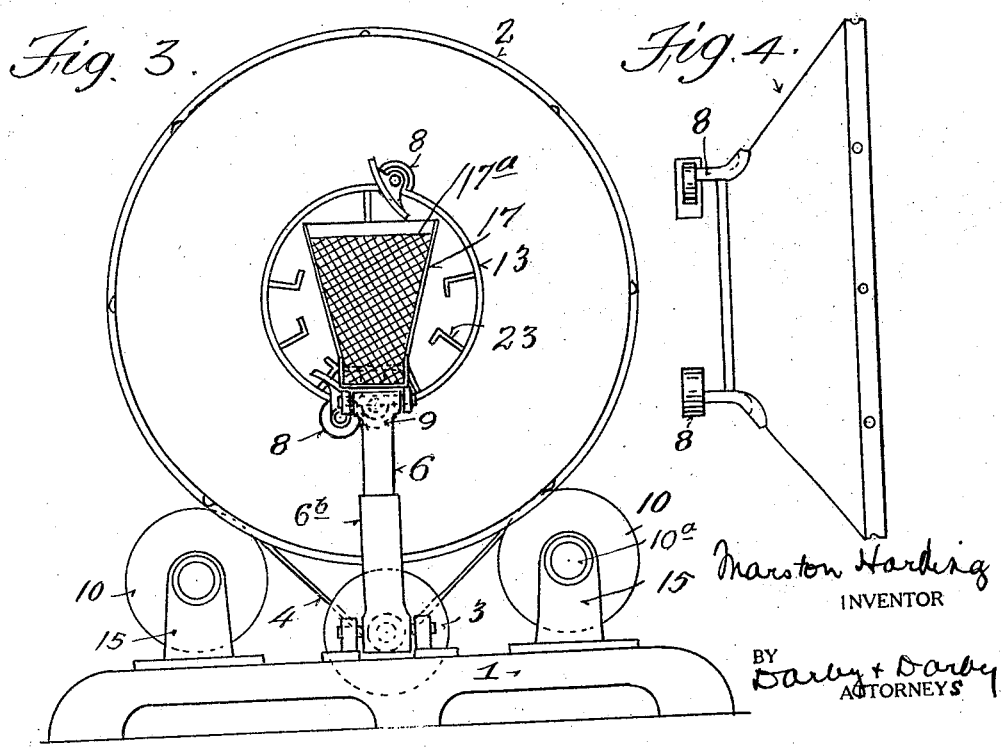
Marston Harding
INVENTOR
BY Darby & Darby
ATTORNEYS Sept. 6, 1932.  M. HARDING  1,876,224
CANDY SUGARING MECHANISM
Filed July 22, 1930   3 Sheets-Sheet 3
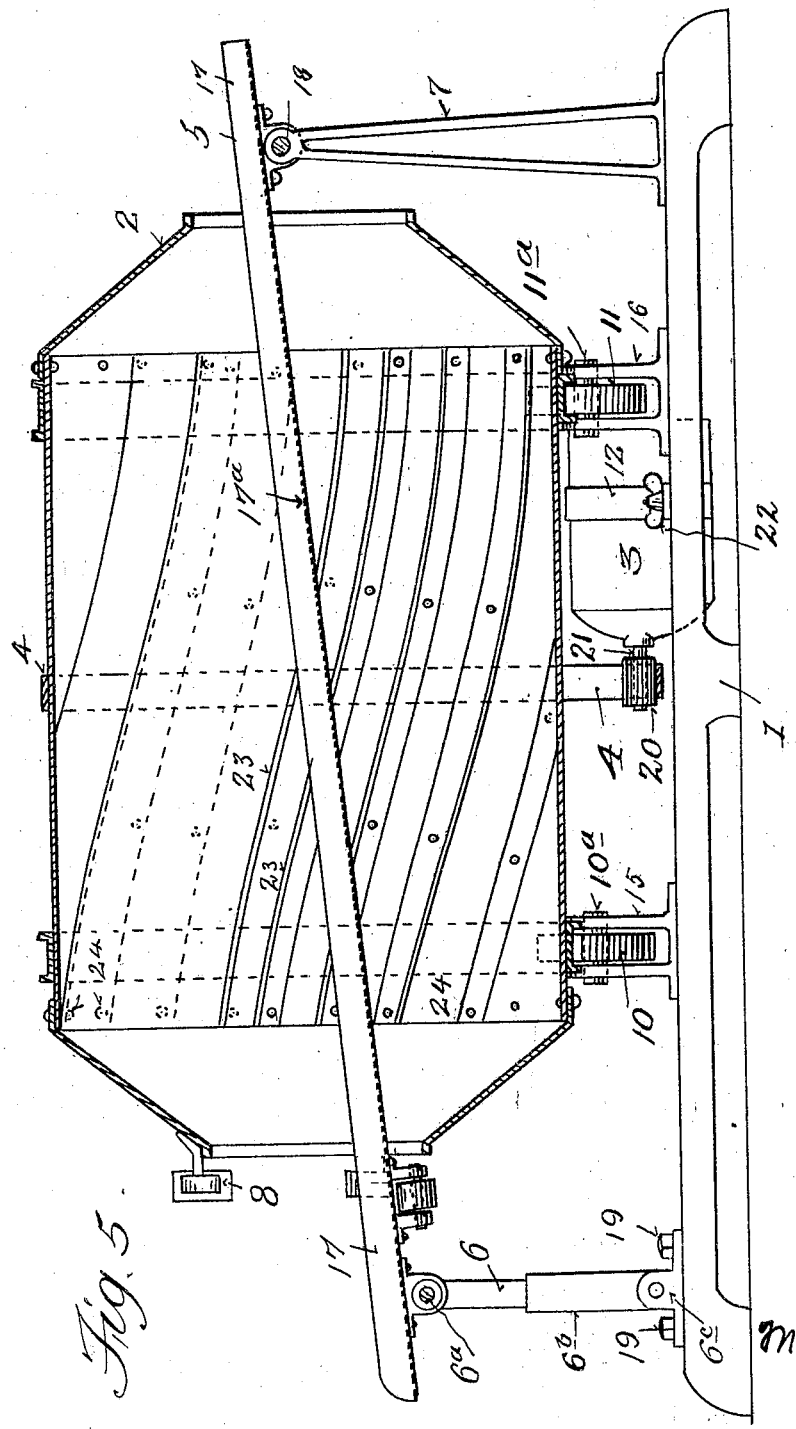
Marston Harding
INVENTOR
BY Darby + Darby
ATTORNEYS Patented Sept. 6, 1932

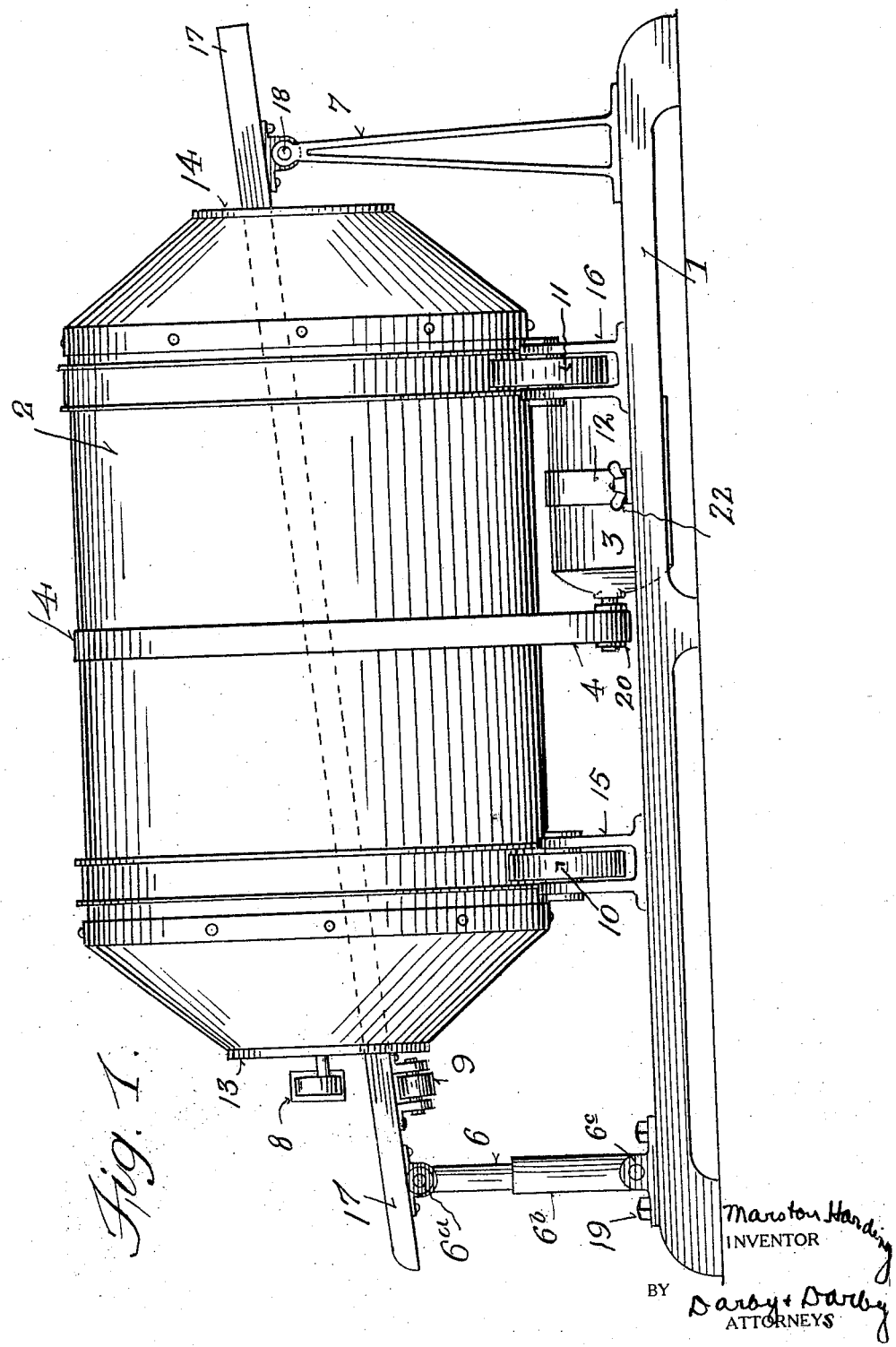

1,876,224

UNITED STATES PATENT OFFICE

MARSTON HARDING, OF NEW YORK, N. Y.

CANDY SUGARING MECHANISM

Application filed July 22, 1930. Serial No. 469,830.

My invention relates to new and useful improvements in candy sugaring mechanism and more particularly to mechanism of this type where the candy to be coated with the sugar is advanced through the coating mechanism along a tray.

The invention has for its primary object to provide an improved mechanism which is adapted to automatically coat or cover candy with sugar or like material as said candy passes through the same.

A further object of the invention is to provide a continuously operated candy sugaring mechanism with novel means to agitate the candy as it passes through said mechanism so as to insure the complete coating of said candy with the coating material.

Other objects of this invention will be apparent from the following description and claims.

The invention consists substantially in the combination, construction, location and relative arrangement of the parts all as will be more fully hereinafter set forth as shown in the accompanying drawings and finally pointed out in the claims.

In the drawings:

Figure 1 is a side elevational view of a candy sugaring mechanism embodying my invention;

Fig. 2 is an end elevational view of the right-hand side of the mechanism as shown in Fig. 1;

Fig. 3 is an end elevational view of the left-hand side of the mechanism as shown in Fig. 1;

Fig. 4 is a side elevational view of the left end of the drum which forms part of said mechanism;

Fig. 5 is a sectional view of the mechanism as shown in Fig. 1.

Referring to the drawings by numerals, 1, designates the base or chassis upon which the operating mechanism is mounted. The operating mechanism consists generally of the hollow rotatable drum 2; the electric motor 3; the belt drive 4 for the drum; the screen tray 5, over which, the candy to be coated, passes; the swivel plunger 6 secured to the lower end of said tray; the cams 8 secured to the drum 2; the roller 9 secured to the lower end of said tray; the rollers 10, 10, and 11, 11, which support the drum 2 upon the base or chassis 1; the band 12 which secures the motor 3 to the base or chassis 1; and the support 7 for the upper end of the tray.

The drum 2 is constructed of any suitable material such as a light metal and is provided with the openings 13 and 14 at each end thereof. The interior surface of the drum is provided with the spiral ribs 23 which are mounted therein by any suitable means such as by the rivets or bolts 24.

The drum is supported on the four rollers 10, 10 and 11, 11 which are rotatably mounted on the shafts 10$^a$ and 11$^a$ in the supports 15, 15 and 16, 16. The said supports are secured to the base 1 in any suitable manner.

The tray 5 is constructed with the sides 17 and the bottom portion 17$^a$ made of a suitable screen material. The tray is mounted so that it extends through the drum in a downwardly and inclined direction. The upper end of the tray is pivotally mounted on the support 7 by means of the pivot pin 18. The lower end of the tray is pivotally secured to the plunger 6 by means of the pivot pin 6$^a$. The plunger 6 is mounted so as to reciprocate in the guide 6$^b$, which is pivotally mounted on anchor 6$^c$. Said anchor is secured to the base 1 in any suitable manner such as by the nuts 19, 19.

Mounted on the underside of the tray 5 at its lower end, is the roller 9. The said roller is positioned so that it will be in the path of the cams 8, 8 secured to the end of the drum 2.

The drum 2 is rotated by means of the belt 4 which passes around the drum and also around the pulley 20 secured to the shaft 21 of the electric motor 3. The motor is secured to the base 1 by means of the band 12 which in turn is secured to the base by the screws 22.

The operation of my candy sugaring mechanism is as follows:

The candy to be coated is placed upon the upper end of the tray 5 and the sugar coating material is introduced into the drum through the openings 13 and 14. The motor is then started and the motion imparted to the pulley 20 by the motor shaft 21 drives the belt 4 and causes the drum 2 to rotate on the roller supports 10, 10 and 11, 11. When the drum is rotated it causes the cams 8, 8 to intermittently strike the roller 9 secured to the lower end of the tray 5 and thereby cause said lower end of the tray to be intermittently raised and lowered and the plunger 6 to reciprocate in its guide 6ᵇ. The movement of the tray causes the candy placed thereon to be agitated and tumbled downwardly along the tray and during this movement of the candy the rotation of the drum causes the coating material to be thrown over the tray and the candy thereon during their progress down the tray and thus thoroughly coat said candy. The spiral ribs 23 on the interior of the drum causes a proper distribution of the coating material over the tray and candy during the rotation of the drum.

After the candy reaches the lower end of the tray it is allowed to drop into a suitable receptacle or is otherwise removed.

It is obvious that minor changes in the details of construction and the arrangement of parts may be made without departing from the spirit of the invention, as set forth in the appended claims.

What I claim is:

1. In a candy sugaring machine, the combination of a tray and a rotatably mounted drum having open ends through which said tray extends, means to rotate said drum, cam members carried by said drum for agitating said tray, and spirally disposed ribs on the inside walls of said drum for distributing coating sugar.

2. In a candy sugaring or coating machine, a rotatably mounted drum having open ends, rollers on which said drum is mounted to rotate, means to rotate said drum, a tray extending through the open ends of said drum at an angle with the longitudinal axis of the drum, supports for the tray located exteriorly of the drum, a longitudinal movable joint constituting one of the supports for said tray, and means for moving said tray to operate said joint.

3. In a mechanism for coating candy and the like, the combination of a drum and means to rotate the same, means in said drum for scattering material on the candy to be coated, a tray extending through said drum, a pivot point support on which the upper end of the tray is mounted, and means on the drum for intermittently agitating the lower end thereof vertically.

4. In a mechanism for coating candy and the like, the combination of a drum and means for rotating the same, spiral ribs in said drum for distributing the coating material, means including a tray for carrying articles to be coated through the drum, and means on the drum for intermittently striking the tray to agitate the same.

5. In a mechanism for coating candy and the like, the combination of a drum and means for rotating the same, spiral ribs on the inside of said drum for distributing coating material, a tray extending through the drum, a pivot joint for one end of the tray and a vertically movable joint for the other end, a roller on said tray, and means on the drum for intermittently striking said roller.

In testimony whereof I have hereunto set my hand on this 18th day of July A. D., 1930.

MARSTON HARDING.